United States Patent [19]

Chiago

[11] Patent Number: 5,433,488
[45] Date of Patent: Jul. 18, 1995

[54] BICYCLE PUMP TO PRESTA TYPE VALVE ADAPTER

[76] Inventor: Robert K. Chiago, 912 Waynewood Blvd., Alexandria, Va. 22308

[21] Appl. No.: 231,245

[22] Filed: Apr. 22, 1994

[51] Int. Cl.⁶ .............................................. F16L 35/00
[52] U.S. Cl. .................................. 285/175; 285/915; 285/177; 285/242; 137/223
[58] Field of Search ............... 285/915, 177, 174, 175, 285/12, 242; 137/223, 515.5

[56] References Cited

U.S. PATENT DOCUMENTS

| | | | |
|---|---|---|---|
| D. 342,263 | 12/1993 | Harrell, Jr. | D15/7 |
| 611,442 | 9/1898 | Vaughan . | |
| 927,635 | 7/1909 | Calvert . | |
| 2,459,716 | 1/1949 | Nickelsen et al. | 132/223 |
| 2,907,591 | 10/1959 | Gulick | 285/174 |
| 3,791,406 | 2/1974 | Philipps | 137/515.5 |
| 4,405,158 | 9/1983 | Huberman | 287/177 |
| 4,489,855 | 12/1984 | Boetger | 222/5 |
| 4,589,688 | 5/1986 | Johnson | 285/174 |
| 4,611,828 | 9/1986 | Brunet . | |
| 4,660,867 | 4/1987 | Kemper et al. | 285/915 |
| 4,813,716 | 3/1989 | Lalikos et al. | 285/915 |
| 5,012,954 | 5/1991 | Will . | |
| 5,035,440 | 7/1991 | Chappell . | |
| 5,060,689 | 10/1991 | Csaszar et al. | 285/12 |
| 5,127,804 | 7/1992 | Chappell . | |
| 5,165,727 | 11/1992 | Valley | 285/12 |
| 5,216,902 | 6/1993 | Sagi | 70/39 |
| 5,305,784 | 4/1994 | Carter | 285/242 |
| 5,334,064 | 8/1994 | Ketterman et al. | 285/12 |
| 5,347,913 | 9/1994 | Stepner | 92/58.1 |

*Primary Examiner*—Eric K. Nicholson
*Attorney, Agent, or Firm*—Daniel R. Gropper

[57] ABSTRACT

This invention relates to an adapter between standard bicycle air pumps and Presta type bicycle tire valves. The adapter comprises a flexible, non-permeable connection tube having two ends. A first adapter is placed at one end of the connection tube. This first adapter is configured to mate with a Schrader type valve assembly on a bicycle pump on one end and the connection tube on the other end. A second adapter is configured to closely mate with a male Presta type valve on one side and with the connection tube on the other side. The connection tube is optimally approximately five inches long and may include an anti-backup valve to prevent the increasing air pressure in the tire from working against the pump action. A spoke clip may be included to temporarily secure the connection tube to the spoke of the tire while the adapter is in use to prevent strain on the Presta type valve. Through use of the adapter taught herein, it is less likely that the bicyclist will sheer off or otherwise break a Presta type valve while re-inflating a bicycle tire.

18 Claims, 1 Drawing Sheet

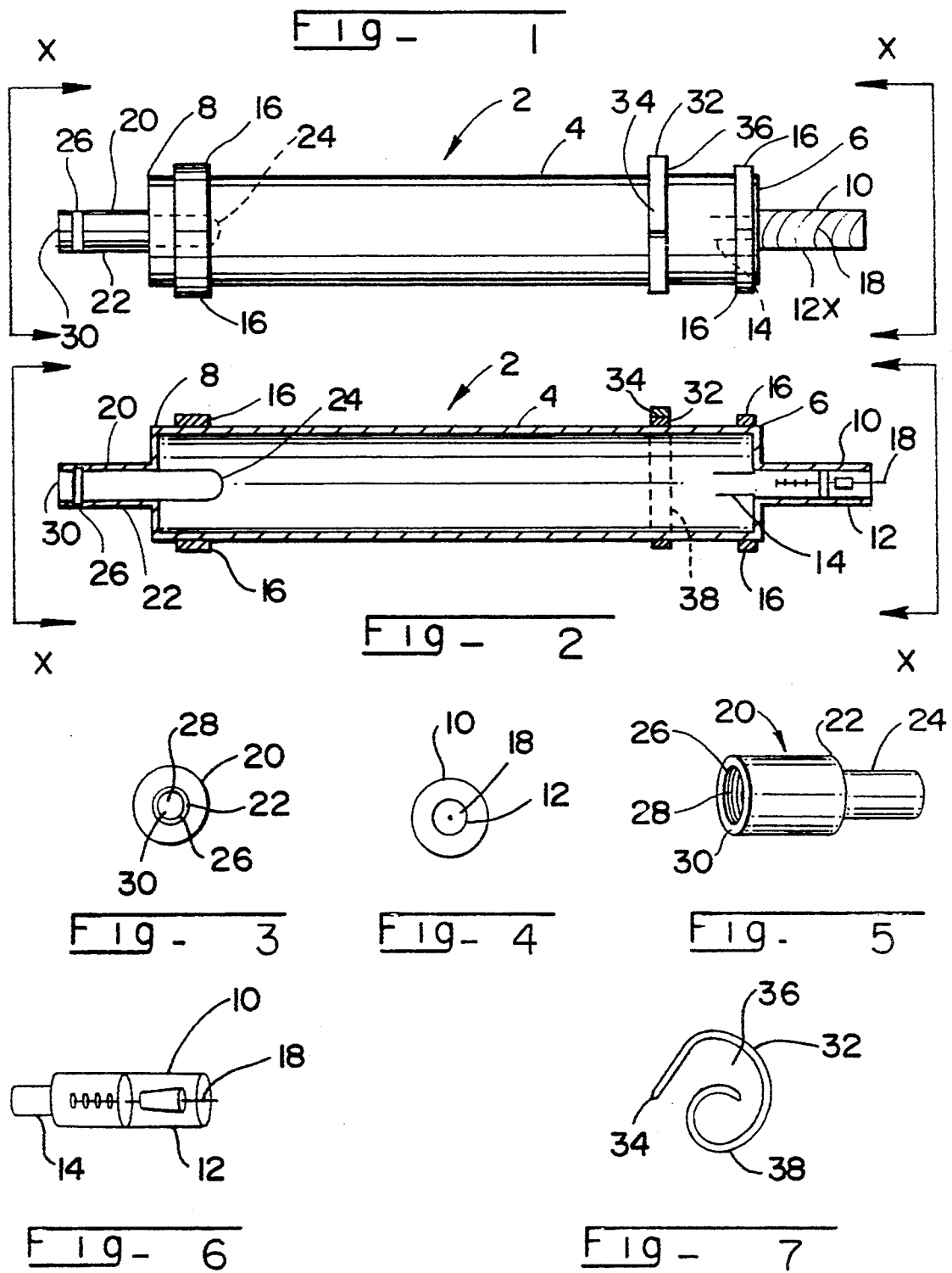

BICYCLE PUMP TO PRESTA TYPE VALVE ADAPTER

BACKGROUND OF THE INVENTION

There are at least two common types of bicycle tire air valves in widespread use. One type is a Schrader type valve which is a reasonably rugged valve in which the valve assembly is protected by an outer casing. It is for this reason that such an air valve is commonly used on automobiles and trucks.

In an effort to reduce the overall weight of high tech bicycles, the lighter weight, yet more fragile, Presta type valves have become widely used for bicycle tire valves. Unfortunately, Presta type valves are often broken during the inflating procedure because of the leverage of the long frame pump combined with the tight fit of a press-on Presta type pump head which provides ample force to shear off Presta type valve heads. Accordingly, it has become a common problem to snap off Presta type valve stems during the inflating process. This causes the bicyclist to replace the inner tube, if one is available, often in difficult conditions on the road. If a tube is not available, or the bicyclist does not have the necessary skills or tools to change the tube, the bicycle will remain out of service until adequate repairs can be made.

To avoid snapping off Presta type valve stems, a bicyclist must hold the pump as still as possible and exactly perpendicular to the Presta type valve stem during the inflating process. This is difficult to accomplish in the field where the bicyclist often has sweaty hands and gloves.

Bicycling journals have offered advice to cyclists trying to inflate bicycle tires with Presta type valves of trying to wrap a hand around the pump head and the tire to keep the pump head seated and to reduce the chance of the pump slipping through the bicyclist° s sweaty hands as the last few pounds of air are forced into the tire. Alternatives include trying to brace the wheel and pump against a tree or the ground. Care must also be taken when removing the pump head because it is easy to snap a Presta type valve stem if the pump head is detached at an angle.

Breaking a valve stem is always inconvenient and, in certain circumstances, may even become far more serious and possibly a life threatening problem.

The present invention teaches a simple, inexpensive, light weight and versatile adapter between present Schrader type and Presta type bicycle hand pumps, and Presta type valves which will tend to eliminate the above-described problems of breaking Presta type valve stems when the invention taught herein is properly used by bicyclists.

SUMMARY OF THE INVENTION

An object of this invention is to provide a simple, inexpensive, light weight and versatile adapter between Schrader type or Presta type bicycle pumps, and Presta type valves on bicycle tires to permit the bicyclist to inflate a bicycle tire without sheering the Presta type valve stem.

A further object of this invention is to provide a bicycle pump to Presta type valve adapter containing an anti back-up valve to prevent air pressure build-up from within the tire from working against the pump action.

A further object of this invention is to provide a spoke clip to further stabilize the bicycle pump to Presta type valve adapter to the spoke next to the valve to prevent the adapter from moving during inflation and thereby sheering the Presta type valve stem.

DESCRIPTION OF THE DRAWINGS

FIG. 1 is a perspective view of the bicycle pump to Presta type valve adapter.

FIG. 2 is a cut away elevational view, along Axis XX, showing the longitudinal axis of the first adapter.

FIG. 3 is an end elevational view of the pump side of the second adapter.

FIG. 4 is an end elevational view of the Presta type valve side of the first adapter.

FIG. 5 is a side elevational view of the second adapter.

FIG. 6 is a side elevational view of the first adapter

FIG. 7 is a side elevational view of the spoke clamp.

The bicycle pump to Presta type valve adapter is generally shown as 2 in FIGS. 1 and 2.

The adapter consists of a flexible, non-permeable connection tube having a first end 6 and a second end 8. A first adapter 10 is disposed at the first end 6 of connection tube 4. The first adapter is shown by itself in FIGS. 4 and 6. The first adapter has a first section 12 and a second section 14. The first section of the first adapter 12 is configured to closely mate with a bicycle pump having a female Schrader type valve. The second section of the first adapter 14 is configured to closely mate with the first end of the connection tube 6. The second section of the first adapter 14 may be configured in any manner so as to be inserted into the first end of the connection tube 6 to form a tight seal therewith. The seal between each adapter 10, 20 and the connection tube 6 may be by any presently known or hereinafter invented means of bonding, including, but not limited to heating, friction, or external clamping around connection tube 4. A representative clamp is shown as 16.

Valve assembly 18 is configured in a manner to receive air from the external source such as a bicycle pump, and prevent air pressure received through the second end of the connection tube 8 from backing-up and being released through valve assembly 18. Valve assembly 18 may be of any now known or hereafter invented configuration to provide a one way air flow from the first end of connection tube 6 towards the second end of connection tube 8. A standard Schrader type valve assembly may be used in this application.

FIG. 4 shows an end view of the first adapter 10 showing the first adapter, first section 12 and valve assembly 18.

FIG. 3 shows an end view and FIG. 5 shows a side elevational view of second adapter 20 having second adapter first section 22 which is adapted to receive a male Presta type valve stem and second adapter 24 which is adapted to closely mate with the second end of connection tube 8. The first section of the second adapter 22 is configured to receive the male end of a Presta type bicycle valve assembly within orifice 30 wherein the threads on the male Presta type valve assembly are configured to mate with internal threads 28 formed in the wall of orifice 30 in the first section of second adapter 22. An O-ring 26 is seated in orifice 30 just inside of the outward end of the first section of the second adapter 22 to ensure an airtight seal with the valve stem of the Presta type valve.

A spoke clamp 32, as shown in FIG. 7, is provided to link adapter 2 to the spoke nearest the Presta type valve on the bicycle tire during use. Spoke clamp 7 may be of any configuration now known or hereinafter invented. Spoke clamp 7 should have an arm assembly 34 to wrap around the spoke and a crotch 36 against which the spoke will rest while the adapter tube is in use. The spoke clamp 32 should have a base ring 38 to slidably be disposed around the exterior surface of connection tube 4.

In use, a bicyclist will take the adapter 2 and screw the first section of second adapter 22 onto the valve stem assembly of the Presta type valve on the bicycle tire. The bicyclist will then rotate spoke clamp 32 around the spoke nearest the Presta type valve on the bicycle to ensure that the adapter will not put undue pressure on the valve stem or the Presta type valve on the bicycle tire.

The connection tube 4 may be of any non-permeable, flexible, resilient material having a central orifice which is adaptable to receive first adapter 10 and second adapter 20 in ends 6 and 8 of thereof. Connection tube 4 can be of any convenient length, but it has been found from experience that between five and six inches is a good working length, while not being unduly cumbersome due to the critical weight considerations for high tech bicycling.

Once the second adapter 20 and spoke clamp 32 have been put in place on the tire assembly, the first section of the first adapter 12 is connected to a bicycle pump or other air pressure source. Most bicycle pumps are configured to be adaptable to either the Presta type or Schrader type of valve assemblies. Service stations and portable air pumps tend to be configured to the more resilient Schrader-type valve assembly. Therefore, a more resilient Schrader type valve assembly may be used for the first adapter for a section 12.

The bicyclist may then place his or her foot or other stabilizing object on the adapter assembly 2 while operating a reciprocating or other type of air pump. The valve assembly 18 prevents the increased air pressure from within the bicycle tire from backing up through connection tube 4 and first adapter 10 to avoid placing additional resistance on the air pump assembly.

Without removing the adapter 2 from the bicycle tire assembly, the pump may be removed from first adapter 10 and the valve assembly 18 will prevent air from escaping from the tire through connection tube 4. At that point, an air pressure gage may be placed on the end of the first section of the first adapter 12 to verify that the proper amount of air pressure has been transferred to the tire tube. If too much pressure has been transferred, the bicyclist may depressed the valve assembly 18 to release air pressure and then conduct a re-check. If more air pressure is needed, the bicyclist may simply re-connect the pump to the first section of the first adapter 12 and increase the air pressure. Many standard tire pressure gages are configured for Schrader type and not Presta type valves. Therefore, the adapter has utility in being able to check air pressure in a bicycle tire with a Presta type valve where only a Schrader type pressure gage is available.

Once the proper amount of air pressure has been transferred to the tire, the air pump is disconnected from the first section of the first adapter 12. Then spoke clamp 32 is disconnected from the supporting spoke and the first section of the second adapter 22 is unscrewed from the Presta type valve.

The adapter assembly is then stored within or near the pump and the bicyclist resumes use of the bicycle.

There are many modifications and adaptations which may be made to this invention without departing from the spirit thereof.

What I claim is:

1. A bicycle pump to Presta valve adapter comprising:
   a) a flexible, non-permeable connection tube having a first end and a second end;
   b) a first adapter having a first section and a second section, wherein said first section of said first adapter is cylindrically shaped, and wherein said first section of said first adapter has an external diameter configured to closely mate with a female Schrader type valve and wherein said second section of said first adapter is configured to closely mate with said first end of said connection tube;
   c) a second adapter having a first section and a second section, wherein said first section of said second adapter is cylindrically shaped, and wherein said first section of said second adapter has an internal diameter configured to closely mate with a male Presta valve and wherein said second section of said second adapter is configured to closely mate with said second end of said connection tube;
   d) wherein, said bicycle pump to Presta valve adapter is formed by bonding said second section of said first adapter to said first end of said connection tube and by bonding said second section of said second adapter to said second end Of said connection tube thereby forming a continuous and air tight unitary apparatus between the end of said first section of said first adapter and the end of said first section of said second adapter;
   e) a valve assembly which prevents pressurized air from escaping from a pressurized bicycle tire through said valve adapter when said valve adapter is connected to a bicycle tire; and,
   f) a spoke clamp slidably disposed around said connection tube.

2. A bicycle pump to Presta type valve adapter, as recited in claim 1, wherein said connection tube is rubber.

3. A bicycle pump to Presta type valve assembly, as recited in claim 1, wherein said first adapter is made of metal.

4. A bicycle pump to Presta type valve adapter, as recited in claim 1, wherein said first adapter is made of plastic.

5. A bicycle pump to Presta type valve adapter, as recited in claim 1, wherein said second adapter is made of metal.

6. A bicycle pump to Presta type valve adapter, as recited in claim 1, wherein said second adapter is made of plastic.

7. A bicycle pump to Presta type valve adapter, as recited in claim 1, wherein said valve assembly is a Schrader type of valve.

8. A bicycle pump to Presta type valve adapter, as recited in claim 1, wherein said second section of said first adapter is held in air tight contact with the central orifice of said connection tube by a clamp disposed around the periphery of said connection tube.

9. A bicycle pump to Presta type valve adapter, as recited in claim 1, wherein said second section of second adapter is held in air tight connection within the orifice of said connection tube by a clamp around the periphery of said connection tube.

10. A bicycle pump to Presta type valve adapter, as recited in claim 1, wherein said spoke clamp is made of metal.

11. A bicycle pump to Presta type valve adapter, as recited in claim 1, wherein said spoke clamp is made of plastic.

12. A bicycle pump to Presta type valve adapter, as recited in claim 1, wherein said connection tube is made of plastic.

13. A bicycle pump to Presta type valve adapter, as recited in claim 1, wherein said second section of said first adapter is held in place within the orifice of said connection tube by adhesive.

14. A bicycle pump to Presta valve adapter, as recited in claim 1, wherein said second section of the said second adapter is held in place within the orifice of said connection tube by adhesive.

15. A bicycle pump to Presta type valve adapter, as recited in claim 1, further comprising an "O" ring disposed within the orifice of said first section of said second adapter.

16. A bicycle pump to Presta type valve adapter, as recited in claim 1, wherein the orifice of said first section of said second adapter is internally threaded to mate with the valve stem of a Presta valve.

17. A bicycle pump to Presta type valve adapter, as recited in claim 1, wherein said valve is spring operated.

18. A bicycle pump to Presta type valve adapter, as recited in claim 1, wherein the outer surface of said first section of said first adapter is threaded.

* * * * *